(Model.)
H. A. & W. M. HOLMES.
GRAIN BINDER.
No. 497,278. Patented May 9, 1893.
13 Sheets—Sheet 1.
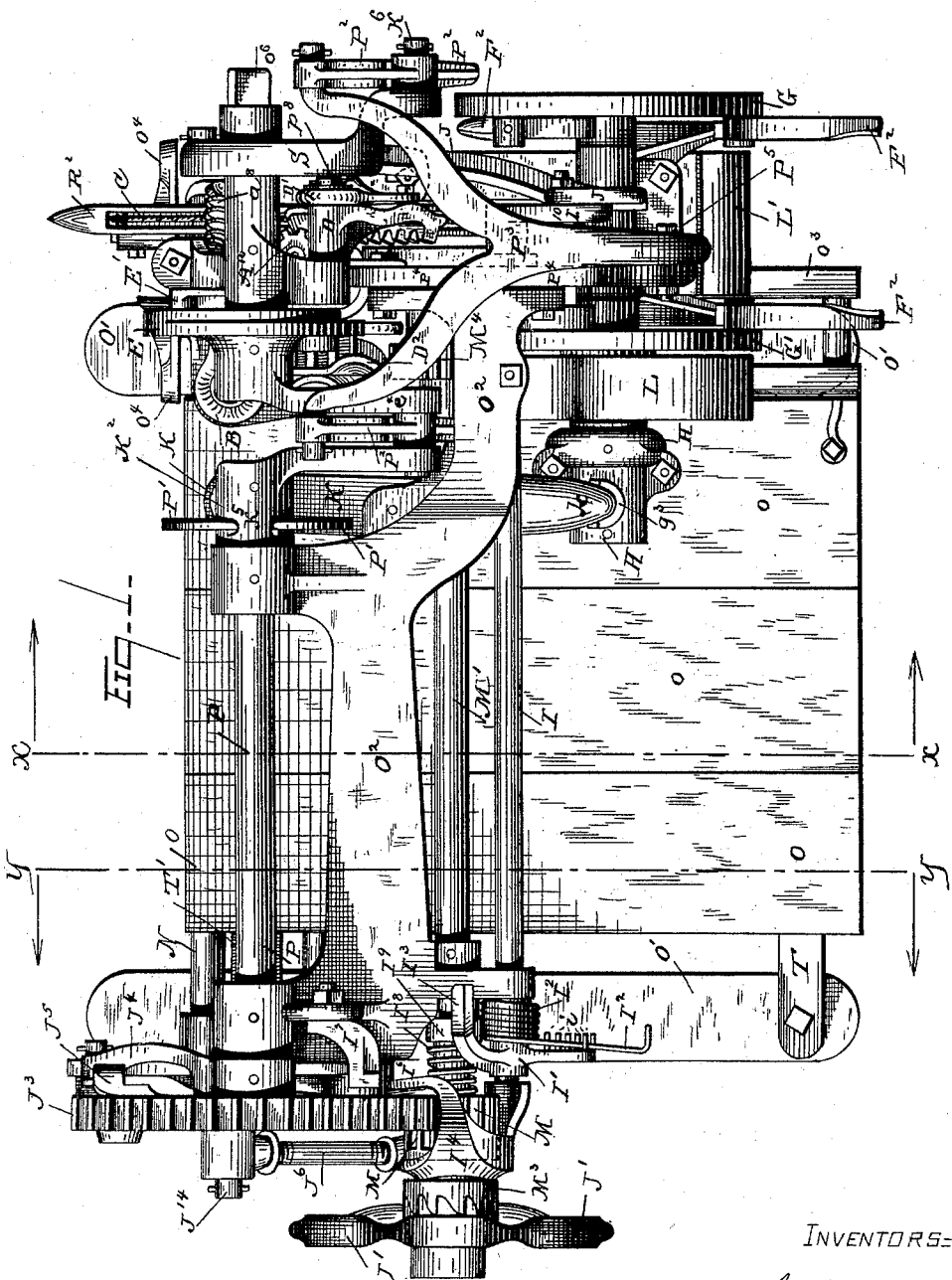
WITNESSES:
INVENTORS:
Hector A. Holmes
Watson M. Holmes
By J. Russell Parsons
Attorney

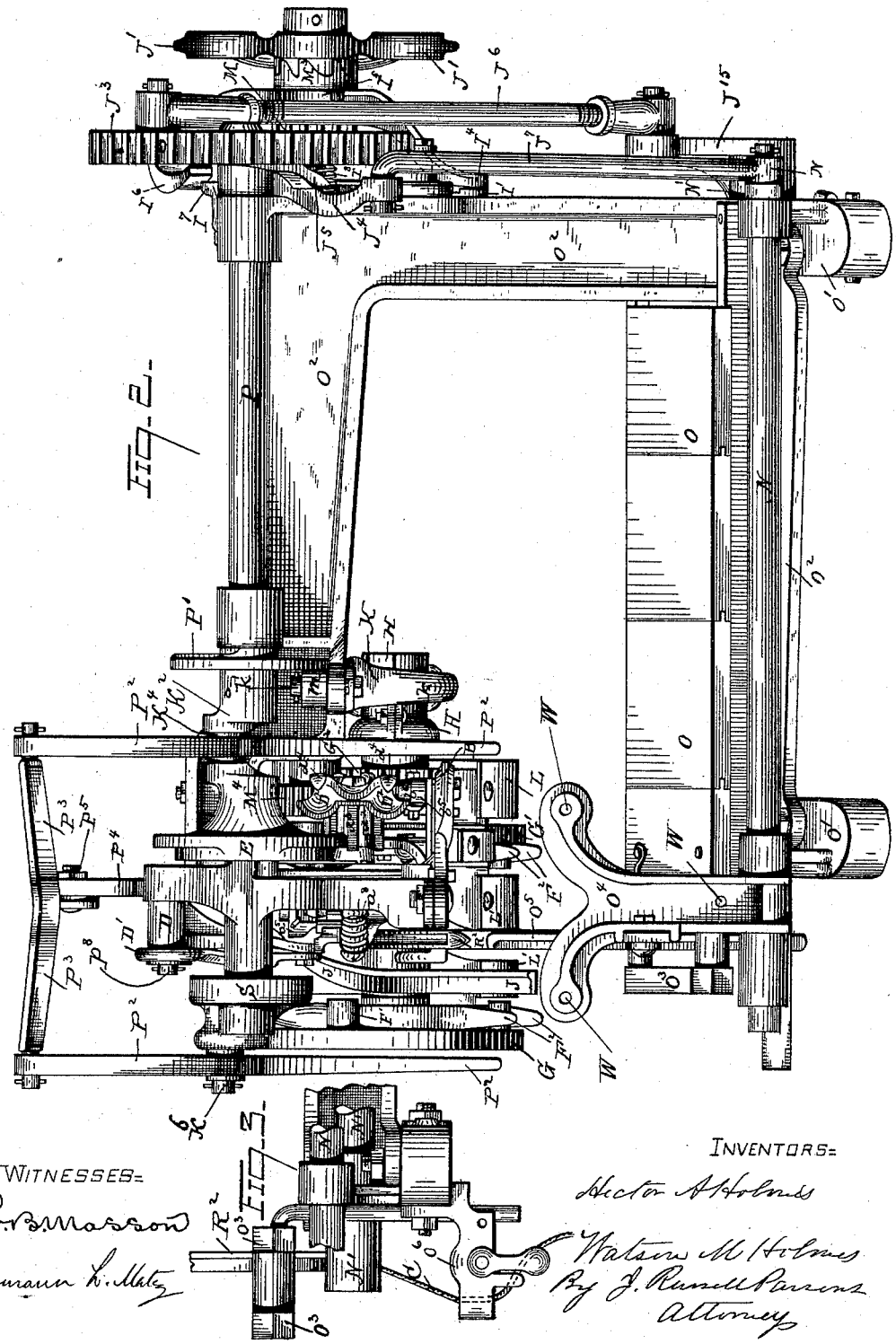

(Model.)
H. A. & W. M. HOLMES.
GRAIN BINDER.
No. 497,278.
13 Sheets—Sheet 3.
Patented May 9, 1893.
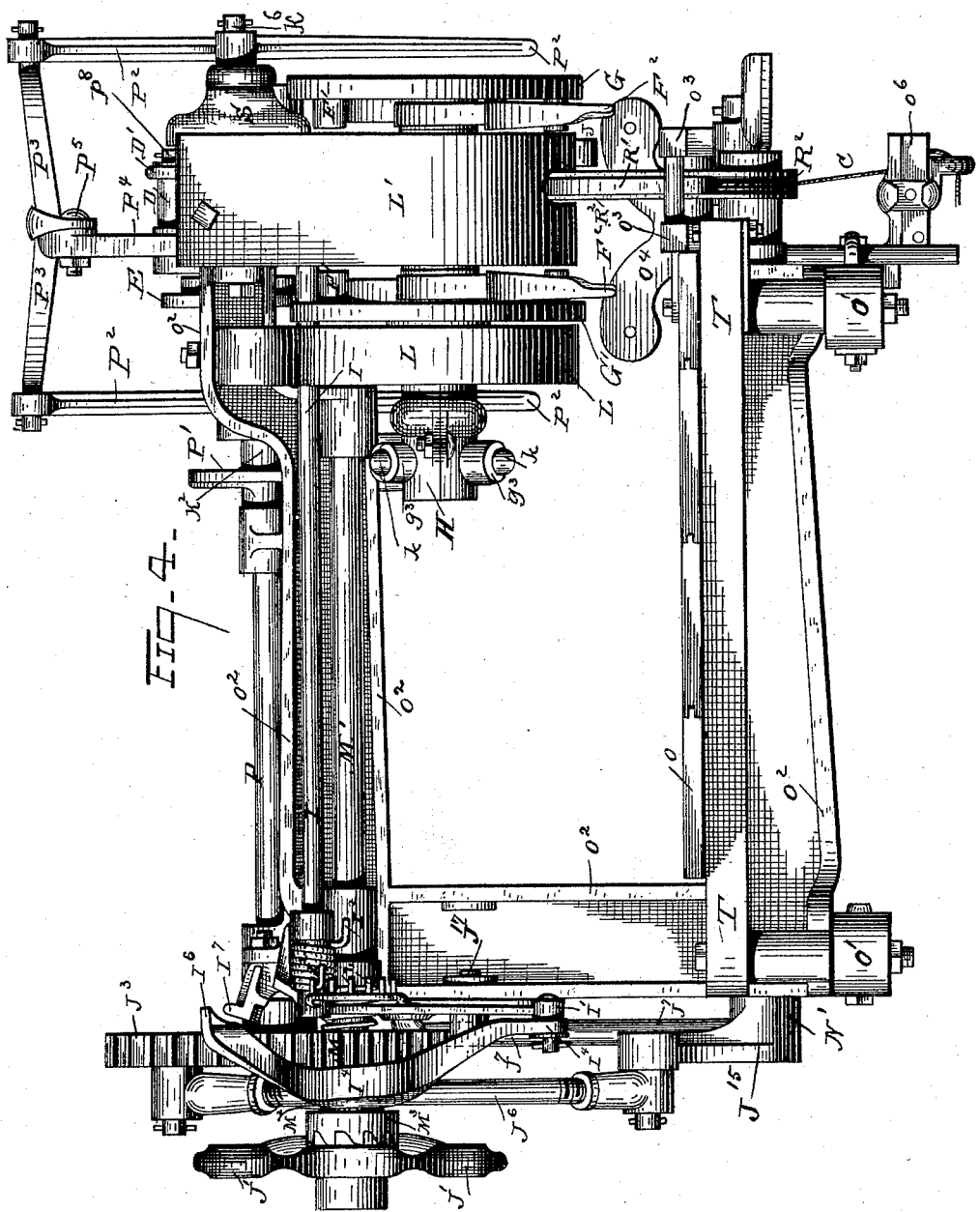
WITNESSES:
INVENTORS:
Hector A. Holmes
Watson M. Holmes
By J. Russell Parsons
Attorney (Model.)

H. A. & W. M. HOLMES.
GRAIN BINDER.

13 Sheets—Sheet 4.

No. 497,278. Patented May 9, 1893.

WITNESSES:

INVENTORS:

(Model.)  H. A. & W. M. HOLMES.
GRAIN BINDER.

No. 497,278.   Patented May 9, 1893.

Witnesses:
Inventors:

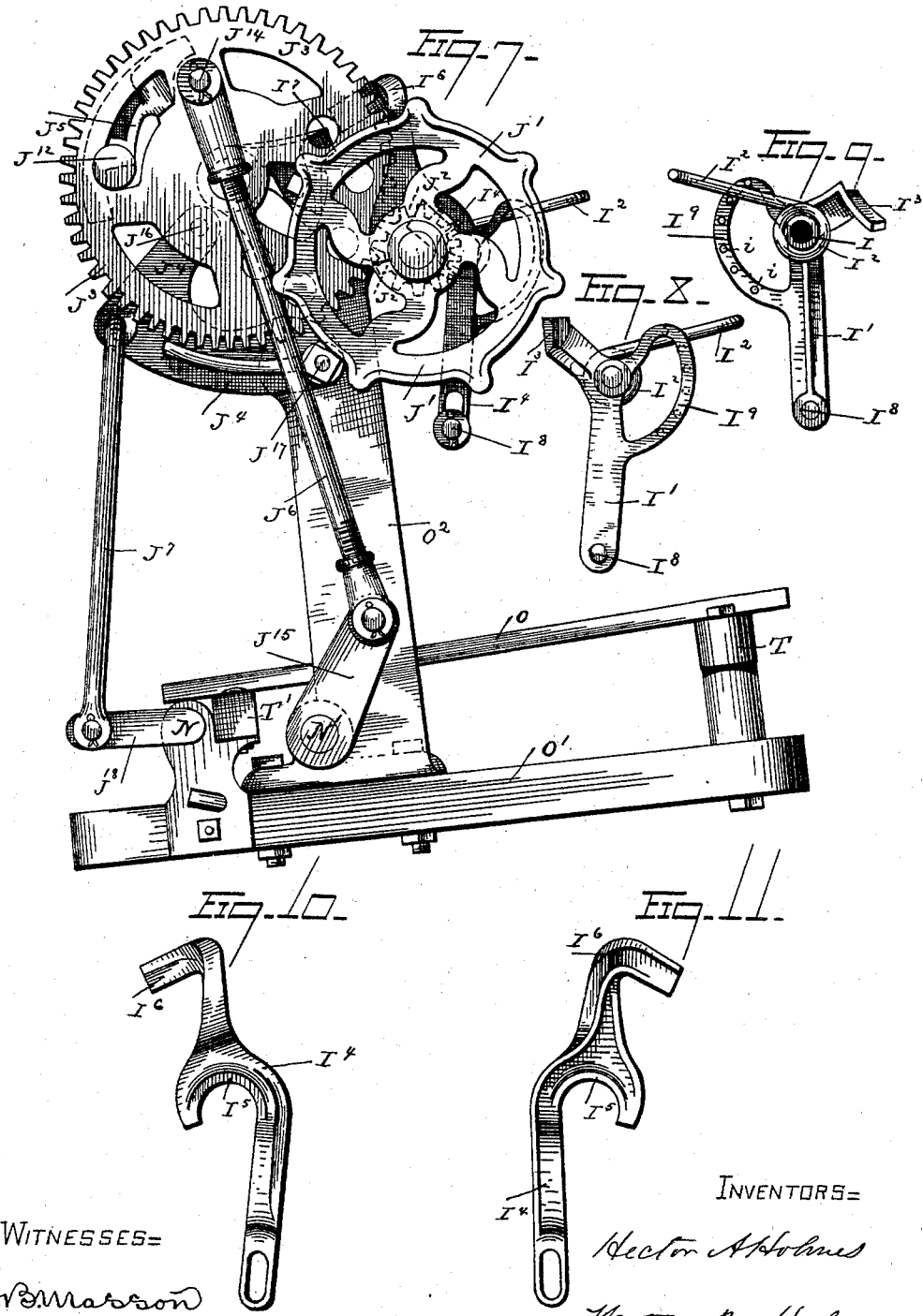

(Model.)
H. A. & W. M. HOLMES.
GRAIN BINDER.
No. 497,278.
13 Sheets—Sheet 7.
Patented May 9, 1893.
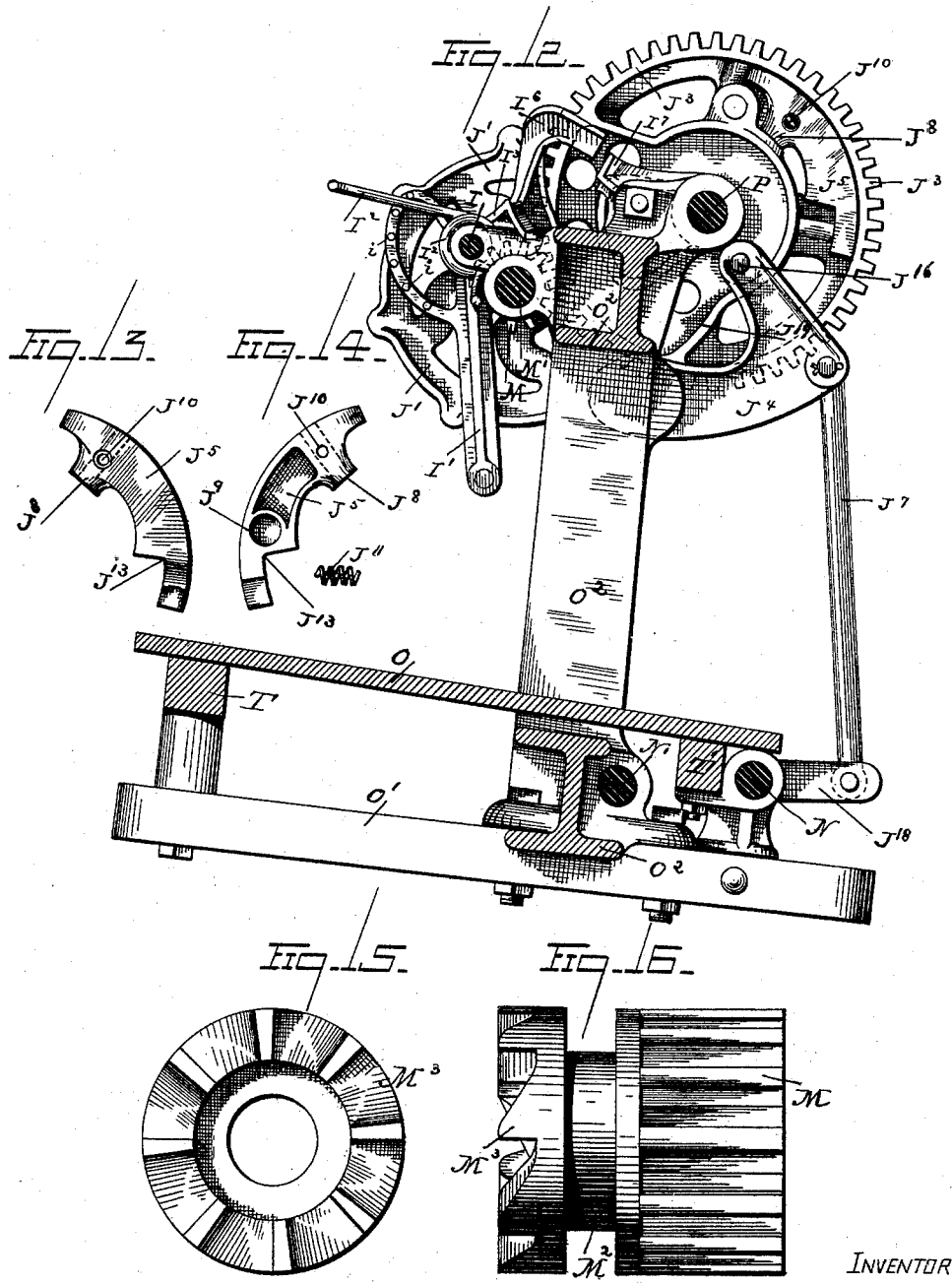
WITNESSES:
INVENTORS:

(Model.)          H. A. & W. M. HOLMES.      13 Sheets—Sheet 8.
GRAIN BINDER.
No. 497,278.                 Patented May 9, 1893.
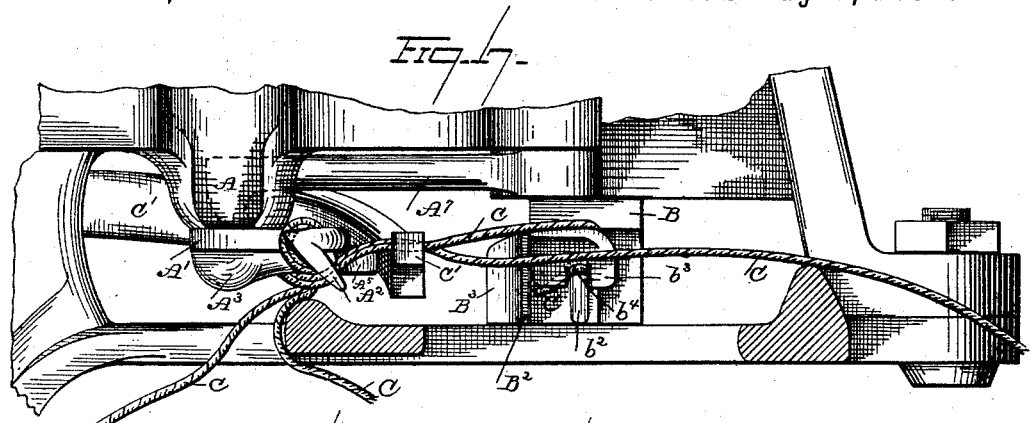
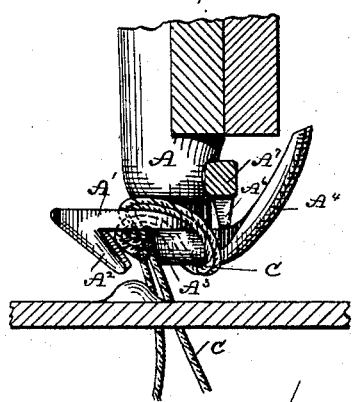 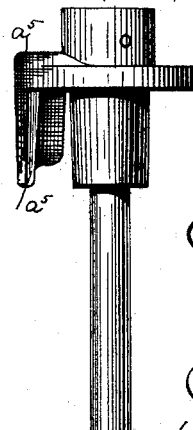 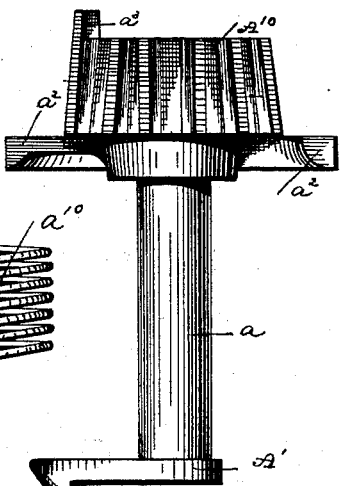
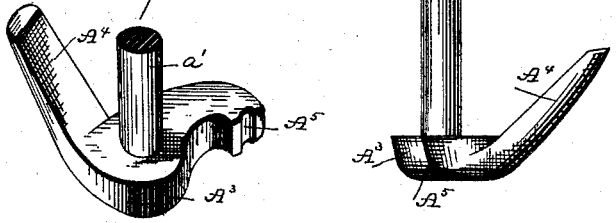 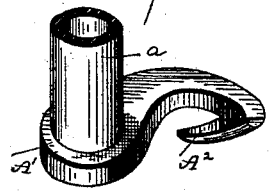
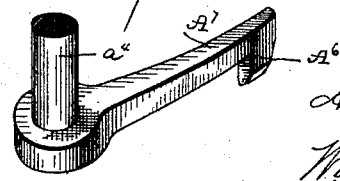
WITNESSES:                          INVENTORS:

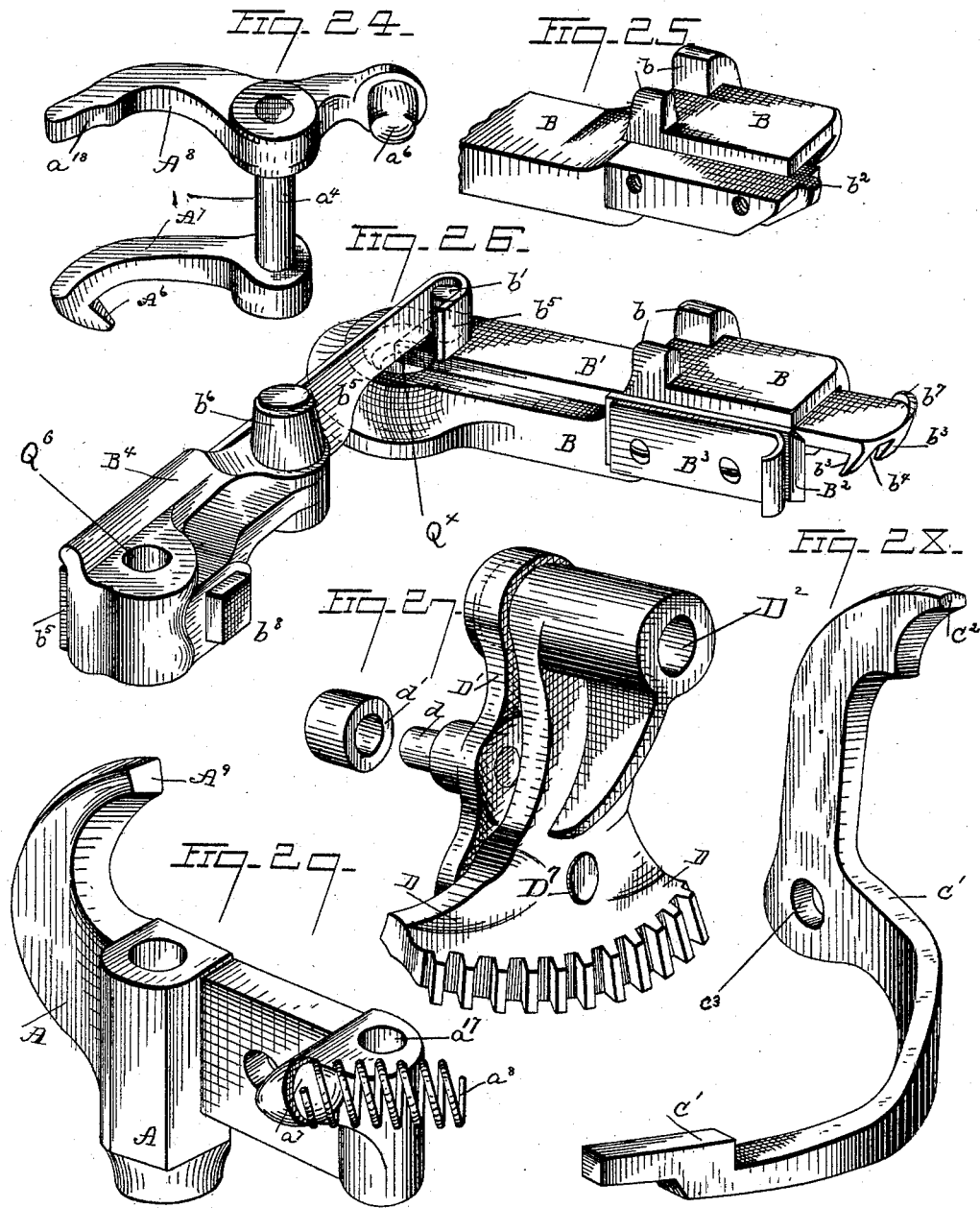

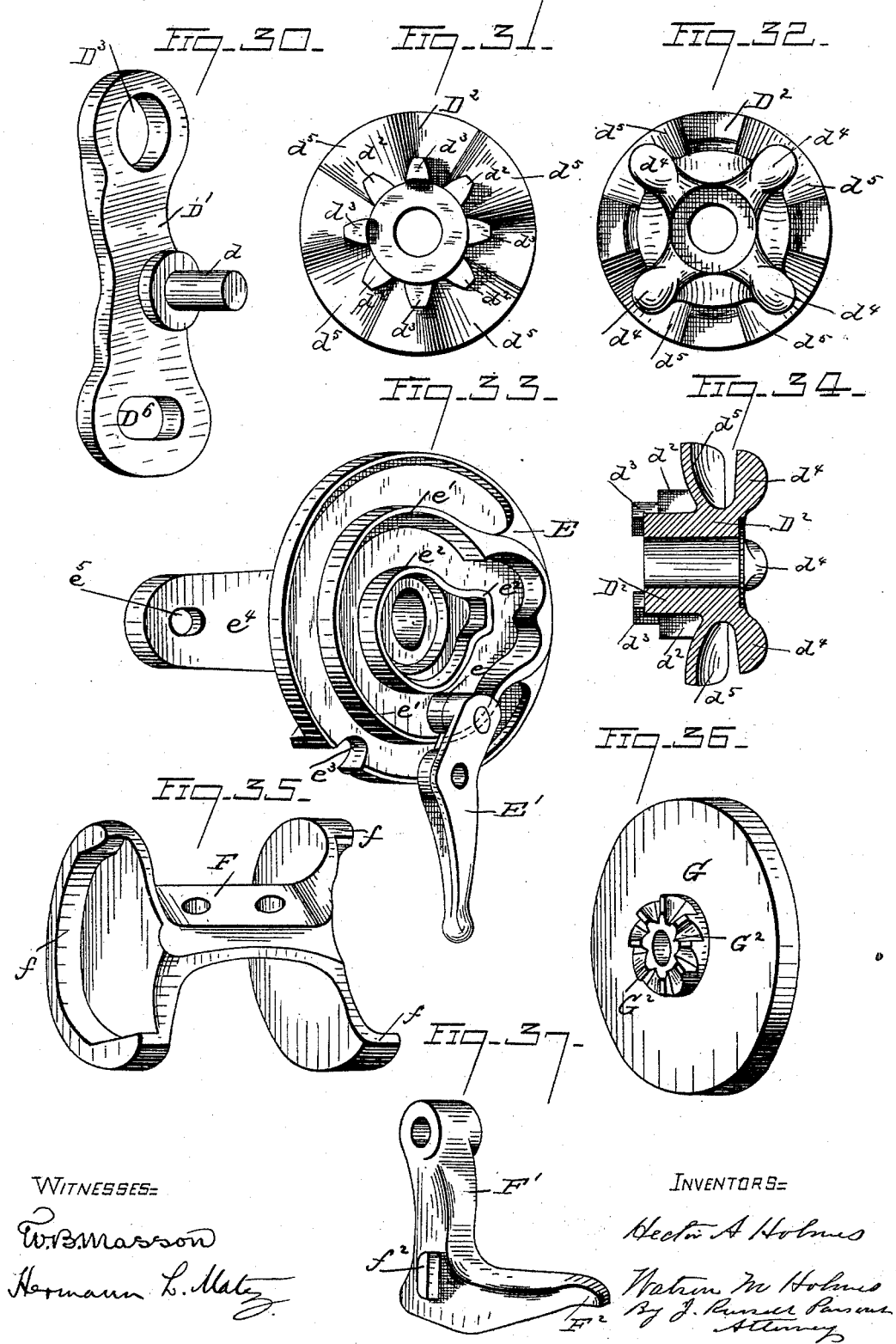

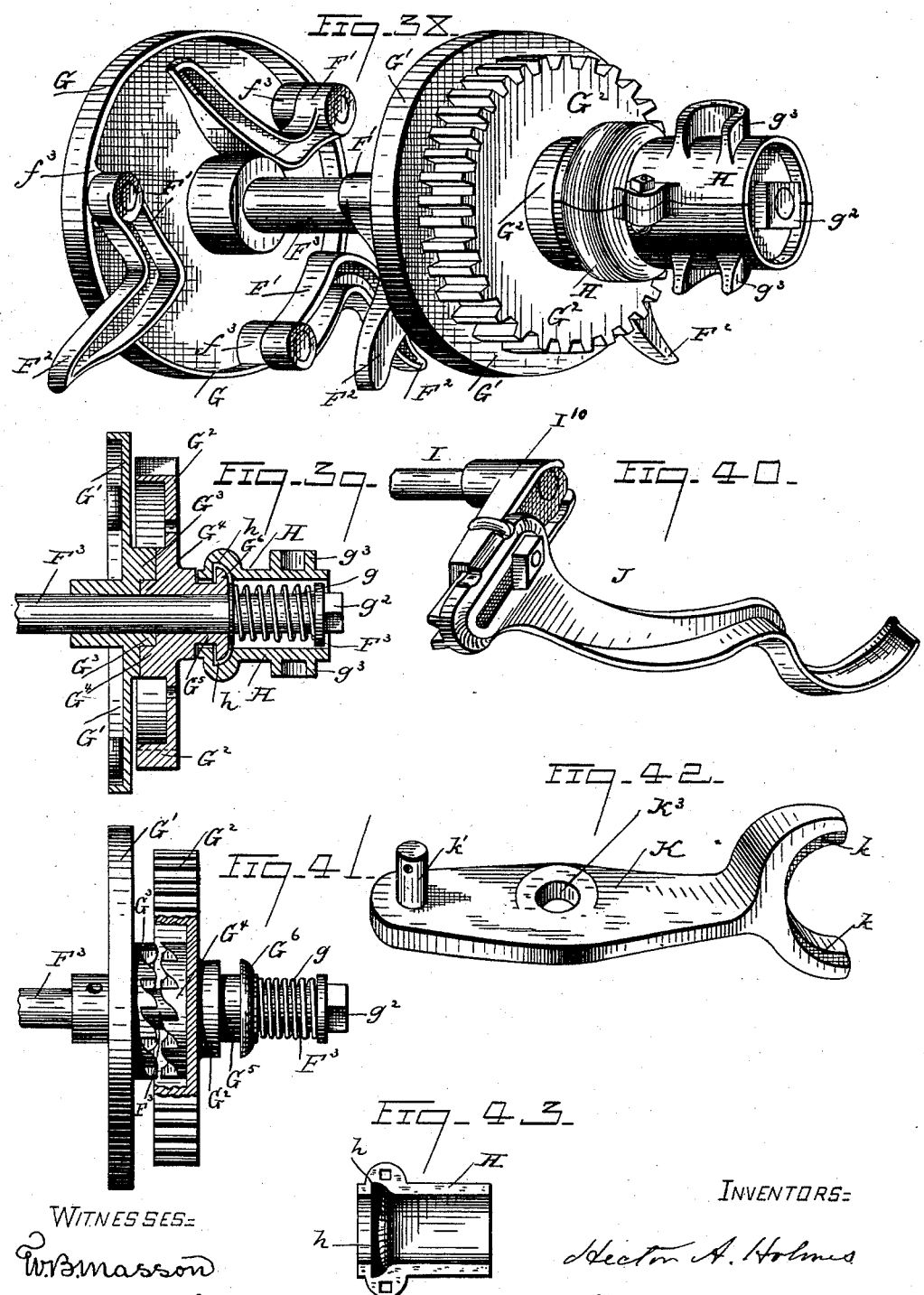

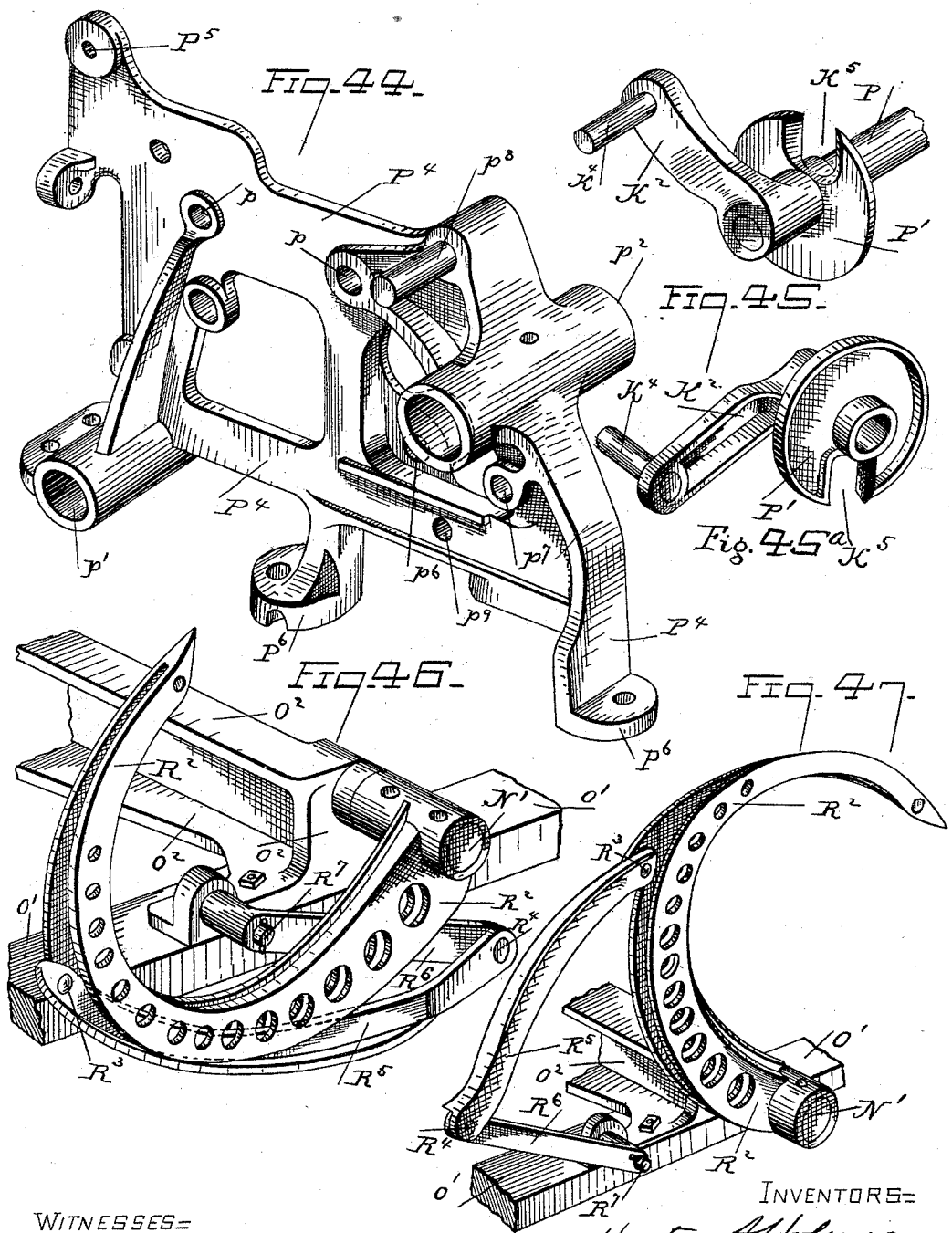

(Model.) H. A. & W. M. HOLMES.
GRAIN BINDER.

No. 497,278. 13 Sheets—Sheet 13. Patented May 9, 1893.

WITNESSES:
W. B. Masson
Hermann L. Matz

INVENTORS:
Hector A. Holmes
Watson M. Holmes
By J. Russell Parsons
Attorney

UNITED STATES PATENT OFFICE.

HECTOR A. HOLMES AND WATSON M. HOLMES, OF HOOSICK FALLS, NEW YORK.

GRAIN-BINDER.

SPECIFICATION forming part of Letters Patent No. 497,278, dated May 9, 1893.

Application filed January 5, 1884. Serial No. 116,550. (Model.) Patented in Canada February 23, 1885, No. 21,130.

*To all whom it may concern:*

Be it known that we, HECTOR A. HOLMES and WATSON M. HOLMES, both of the village of Hoosick Falls, in the county of Rensselaer and State of New York, have invented certain new and useful Improvements in Grain-Binders, (for which we obtained a patent in Canada February 23, 1885, No. 21,130;) and we do declare the following to be a full, clear, and accurate description of the same, reference being had to the accompanying drawings, making a part of this specification, in which—

Figure 5:
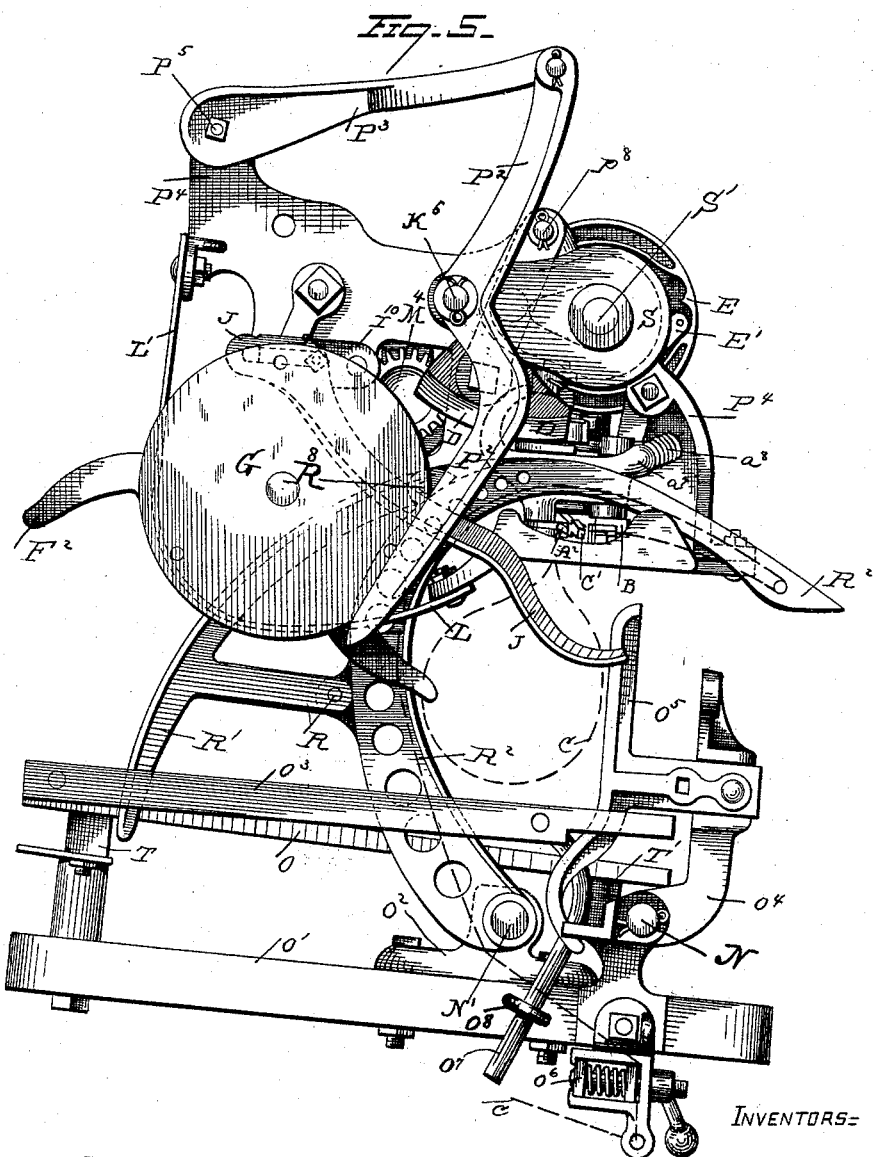
Figure 6:
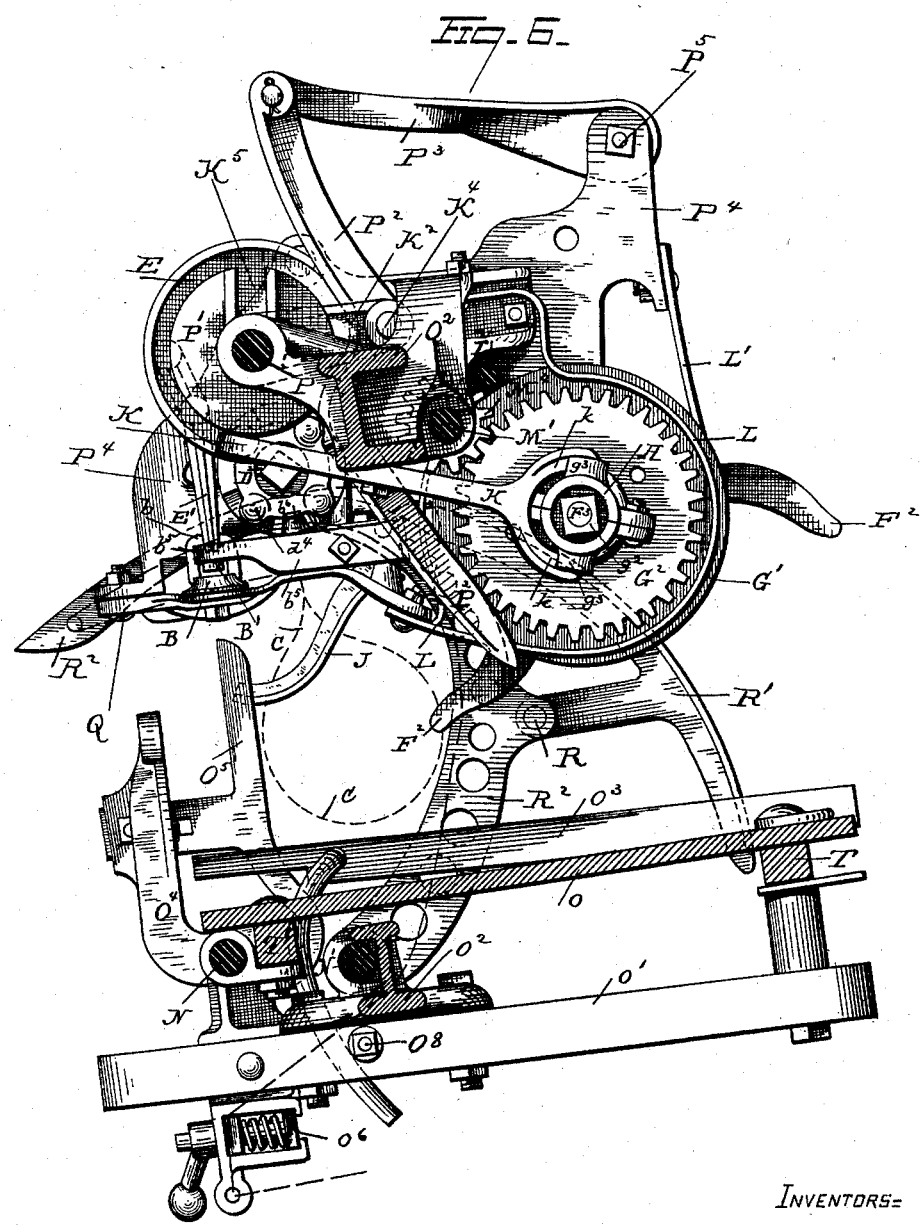
Figure 48:
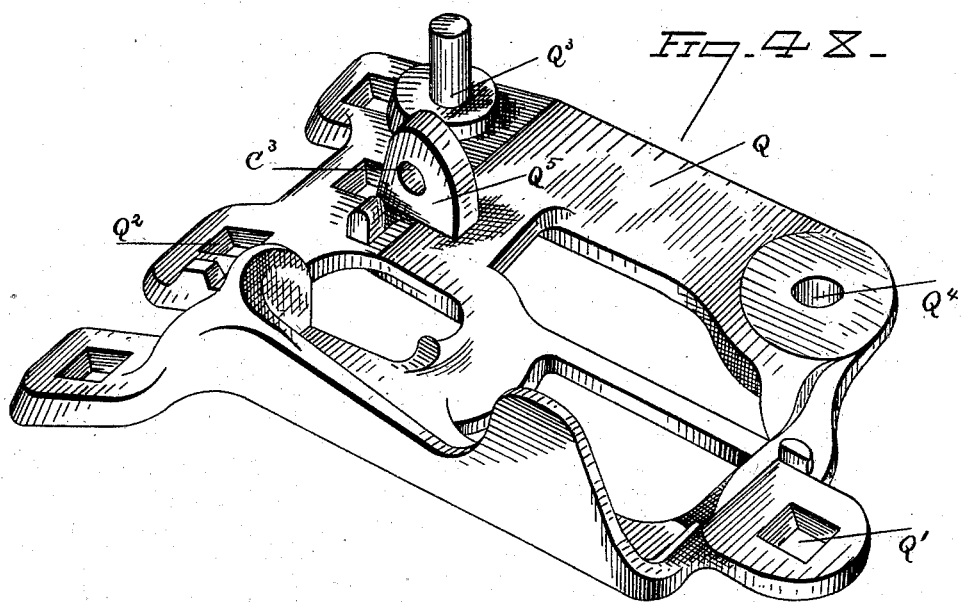
Figure 49:
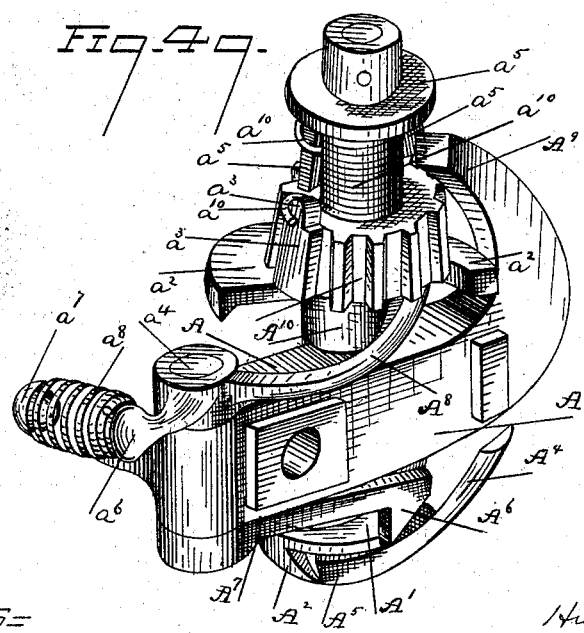

Figure 1: is a top plan view of the binder. Fig. 2: is an elevation of the side of the binder from which the bound grain is discharged. Fig. 3: is a view of the tension device and its connection with the other parts of the machine from the stubble side. Fig. 4: is an elevation of the machine on the side opposite Fig. 3. Fig. 5: is an elevation of the rear end of the binder. Fig. 6: is an elevation of a section taken on line *x. x.* Fig. 1, looking in the direction of the arrow. Fig. 7: is an elevation of the forward end of the binder. Figs. 8, 9, 10 and 11, are detail views of a portion of the tripping device. Fig. 12, is an elevation of a section on line *y. y.* Fig. 1, looking in the direction of the arrow. Figs. 13, 14, 15 and 16 are detail views of other parts of the tripping device. Fig. 17, is an elevation of the knot tying device, with the binding cord in position on the machine looking from the rear. Fig. 18. is an elevation of the knotter with the cord, the knot being partly tied. Figs. 19, 20, 21, 22, 23 and 24, are detail views of the knotter. Fig. 25, is a view in perspective of the portion of the grasper, which holds the cord. Fig. 26. is a view in perspective of the grasper with the knife which severs the cord, and the lever which moves the sliding bar of the grasper. Fig. 27. is a view in perspective of the segmental gear which drives the knotter. Fig. 28, is a view in perspective of the tucker which raises the cord up toward the knotter, to insure its being caught by the knotter jaws. Fig. 29. is a view in perspective of the support for the knotter shaft. Fig. 30. is a view in perspective of the plate connecting the knotter operating segmental gear with the cam disk which drives it. Figs. 31. and 32. are side elevations of the pinion, with its cam surfaces which moves the sliding bar of the grasper longitudinally. Fig. 33, is a view in perspective of the notched cam-disk which drives the pinion shown in Figs. 31, and 32; also the lever and roller which move the grasper bodily backward and forward. Fig. 34, is a view partly in section, and partly in elevation of the pinion shown in Figs. 31, and 32. Fig. 35, is a view in perspective of the cam flanges over which the packer fingers work. Fig. 36, is a view in perspective of the front packer disk. Fig. 37, is a view in perspective of one of the packer fingers detached. Fig. 38, is a view in perspective of the two packer disks, the packer fingers fastened thereto, together with the gear which drives the packer disks, with the clutch box and the shaft on which the whole are mounted. Fig. 39, is a view partly cross section, and partly elevation, of the forward packer, clutch gear, clutch box, spring and shaft. Fig. 40, is a view in perspective of the tripping lever and its connection with the tripping shaft. Fig. 41, is a view in elevation of the forward packer disk, clutch gear, spiral spring, and shaft. Fig. 42, is a view in perspective of the shifting lever which throws clutch gear in and out of connection. Fig. 43, is an elevation of one portion of the clutch box. Fig. 44, is a view in perspective of a frame or casting bolted to the upper limb of the main frame; this frame supports the shaft on which are mounted the packer disks with their fingers, the knot tying device and mechanism for driving the same, also mechanism for opening and closing the jaws of the cord holder or grasper, the shield which supports the cord holder, one end of the tripping lever shaft and the discharging arms. Fig. 45, is a perspective view of one end of shaft P, with the disk controlling the operation of the packers and crank for operating the discharge arms. Fig. 45ᵃ is a perspective view of the reverse side of the same. Figs. 46 and 47, are perspective views of a needle of different construction from the one shown in the other figures. Fig. 48 is a view in perspective of the shield or support for the grasper or cord holder. Fig. 49 is a view in perspective of the support for the knot tyer, and the knot tyer attached.

In order to enable others skilled in the art to make and use our invention, we will proceed to describe the same with reference to the drawings.

Similar letters of reference in the various figures indicate the same part.

This invention presents certain improvements in grain binders as patented to us on the 3d day of December, 1878, No. 210,533, and relates chiefly to the devices for tying the knot, for holding the cord, for stopping and starting the binding mechanism, the mechanism for discharging the bundle, and mechanism for adjusting the size of sheaves to be bound.

Some portions of the machine are substantially the same as described in our said patent, but in order that this invention may be perfectly set forth, we will describe the whole machine and its mode of operation.

This machine belongs to the same class of binders as shown in our previous patent, in which the grain is packed into a sheaf, and when a sufficient quantity has been so packed to form a sheaf, the binding device will be set in motion, and continue in motion until the sheaf is bound and discharged from the machine. This machine is attached to harvesters which cut the grain and deliver it when cut in any of the well known ways. In practice we prefer to locate the same at the end of an ordinary harvester, on the stubble side of the machine, and on the outside of the driving wheel, the grain being elevated over the wheel and delivered to the binder, but we do not confine ourselves to this location.

$O^2$. is a main frame cast in one piece in the form of a letter U turned on its side and the lower limb of the letter is bolted to the two cross pieces $O'$; the space between the upper and lower limbs of the frame is sufficient to allow a certain portion of the machinery to be placed between them, and also to allow sufficient room for the sheaf to pass between. The vertical portion of the frame is placed on the main harvester frame toward the horses, the horizontal arms projecting toward the rear the object being to allow long grain to pass through without obstruction, as the butts of the grain whatever its length are always in the same right line or nearly so as they are carried to the binder.

$J'$. is a sprocket wheel which receives continuous motion from mechanism located on the harvester, through the intervention of a chain. This sprocket wheel is rigidly fastened to the end of a shaft $M'$, which is journaled in the top arm of the frame and arranged to turn in suitable bearings fastened thereto. The sprocket wheel $J'$. is provided with clutch teeth cast on the inside of its hub; the office of this clutch connection will be more fully hereinafter explained.

On the opposite end of shaft $M'$. is rigidly fastened the pinion $M^4$. (see Figs. 1, 2, 5, 6), This pinion meshes into a spur gear wheel $G^2$. mounted on a counter shaft $F^3$. which shaft is supported in a frame $P^4$. in a bearing $p'$. as shown in Fig. 44, fastened securely to the end of the upper limb of the frame $O^2$. This wheel $G^2$. gives motion to the packer disks G. and $G'$. which are shown in Fig. 38. As the sprocket wheel $J'$. is in constant motion when the harvester is moved forward, the packer disks would also move constantly, except some mechanism was interposed to stop the same at the proper time. The sprocket wheel $J'$ is the prime mover of the binder mechanism.

It is necessary when a sufficient amount of grain has been packed to form a sheaf to start the binding apparatus to stop the packing mechanism, to bind and discharge the sheaf, and when it is bound and discharged to stop the binder and start again the packers to make the succeeding sheaf. We will describe next the means by which we accomplish this result. The sprocket wheel $J'$. revolves in a direction at right angles to the path of the harvester and toward the stubble side of the machine. On the shaft $M'$ on the inner side of the sprocket wheel $J'$. is a spur pinion M. (see Figs. 1, 2, 4, 12 and 16), which is loose on the shaft $M'$. its outer face being provided with clutch teeth $M^3$. so arranged as to engage, when required, with the clutch teeth on sprocket wheel $J'$, as hereinbefore stated. (See Figs. 1, 2, 4 and 15.) The other or inner face of the pinion M. is scored out or countersunk at its center sufficiently to form a seat for a coiled spring $I^8$. seen in Figs. 1. and 2; the other end of the coiled spring $I^8$. abuts against a collar $I^9$ fast on shaft $M'$ the spring being coiled around the shaft $M'$; the tendency of this spring is to throw the pinion M, and thereby its clutch teeth into connection with the clutch teeth of the sprocket wheel $J'$. The hub of the pinion M, is made with a groove $M^2$. turned into its circumference between the clutch teeth $M^3$. and the end of the cogs, as shown in Fig. 16. This groove is of sufficient width and depth to receive the crooked shifter lever $I^4$. as shown in Figs. 1, 4, 7, 10, 11 and 12.

On the upper limb of the frame $O^2$. and on the inner side is mounted a shaft P. which turns in suitable boxes on the frame; on one end of this shaft P. is rigidly fixed a gear wheel $J^3$. which meshes into the pinion M. on the shaft $M'$. so that when pinion M. is made to revolve by being clutched to the constantly revolving shaft $M'$. rotary motion will be imparted to the gear wheel $J^3$. When the clutch teeth on pinion M. are disengaged from the clutch teeth on sprocket wheel $J'$. the wheel $J^3$. will remain at rest. The crooked lever $I^4$. is made of such form (see $I^5$, Figs. 10 and 11) as to bestride the grooved hub of the pinion M. and its upper end $I^6$. extends a little above the horizontal diameter of the gear wheel $J^3$. and is formed with a crooked projection $I^6$. which extends inward past the teeth on wheel $J^3$. and extends forward a short distance, which is plainly shown in Figs. 1, 2, and 4.

The inner side of the wheel $J^3$. is made of such shape as to receive on its face and just under its rim a latch or segmental shaped piece $J^5$. see Figs. 13. and 14. showing side elevations of each side of the piece $J^5$; the side shown in Fig. 14. is placed next to the inner surface of the gear wheel $J^3$. and is provided with an enlargement $J^8$. sufficient to receive a pin which passes from the rim of the wheel through the piece $J^5$. at $J^8$. and into inner rim or flange of the wheel $J^3$; this inner rim or flange forms one side of an internal cam, which will be more fully hereinafter described. This pin is held in its place by a split key $J^{10}$. passing through the piece $J^5$; and $J^5$. can oscillate slightly on the pin. The inner face of $J^5$. is made with a circular recess or depression $J^9$. to receive the spiral spring $J^{11}$. the other end of the spiral spring abutting against a similar depression in the boss $J^{12}$. cast on the outer face of wheel $J^3$. as shown in Fig. 7. The latch $J^5$. is made curvilinear in form so as to fit or nearly so, underneath the rim of the wheel $J^3$. and its rear portion is slightly offset or curved laterally so that its rear point (by the term rear we mean its position in relation to its revolution with the wheel $J^3$.) stands out away from the inner face of the wheel $J^3$. The opposite end of the latch $J^5$. is extended beyond the pin on which it oscillates to form a stop, which will strike against the wheel or a projection cast thereon to prevent the rear end of the latch $J^5$ from being thrown out too far by the spring $J^{11}$. The rear end of the latch $J^5$, is cut away on its under side as shown at $J^{13}$. see Figs. 13. and 14.

On top of the frame $O^2$ and in rear of the wheel $J^3$. is fastened a piece $I^7$. as shown in Figs. 1, 2, and 4. This extends a sufficient distance toward the wheel $J^3$. and in such a position, that when the wheel $J^3$. is revolved the rear portion of the latch $J^5$. will be confined between its end and the spring, between the latch $J^5$. and the wheel $J^3$. until the latch $J^5$ has passed by the projection piece $I^7$. sufficiently to allow the spring to act on the latch $J^5$. and press it beyond the end of the projection $I^7$. The cut away portion $J^{13}$. of the latch $J^5$. allows this passage past the projection $I^7$. when the spring $J^{11}$. will act suddenly and press the latch $J^5$. away from the wheel against the projection $I^6$. on $I^4$. and thus move the clutch pinion M. on shaft $M'$. so as to throw the clutch teeth of the same clear out of connection with the clutch teeth on sprocket wheel $J'$., the spring $J^{11}$. being stiffer than the spring $I^8$. on shaft $M'$. When this takes place the binding mechanism comes to rest. When the machine is tripped so as to set the binding mechanism in motion by the withdrawal of the upper end $I^6$. of the shifter lever $I^4$. from connection with the rear end of the latch $J^5$. the wheel $J^3$. revolves and carries with it the latch $J^5$. and the upper end $I^6$. of the shifter lever $I^4$. resumes its place in the path of the revolving latch $J^5$ through the action of the spring on the piece $I'$, see Figs. 1, 4, 7, 9, 10 and 12. When the latch $J^5$. has reached again the proper point it strikes the part $I^6$. and slides the pinion M. on the shaft until its clutch teeth are partially out of connection with the sprocket wheel, and the piece $J^5$. is pushed in and held there by the piece $I^7$. thus compressing the spring $J^{11}$. for a short distance of the wheel's revolution, and until the cut away part $J^{13}$. is reached, when the spring $J^{11}$ throws the clutch teeth on the pinion M. and the sprocket wheel $J'$. entirely free from each other, and holds them clear as long as required; the object being to disconnect the clutches, partially by a positive mechanism, leaving but little comparative work for the spring to do.

Outside of shaft $M'$. and slightly above it, is supported in suitable bearings, one on the frame $O^2$. and the other on the frame $P^4$, a shaft I. as shown in Figs. 1 and 4. On the end of shaft I. is rigidly attached an arm $I'$, see Figs. 1, 4, 9 and 12, which has a downward extension provided with a hole $I^8$. at its lower end to receive a pin which is fastened tightly therein. This pin is made to connect with the lower end of the crooked shifter lever $I^4$, the lever being provided at its lower end with a slot in which the pin may work up and down, the connection being plainly shown in Fig. 4.

The arm $I'$. where it is attached to the shaft I, is provided with a hub of sufficient length to receive a spring $I^2$. coiled around it, one end of the wire forming the coil bearing against the main frame and the other projecting outward and made adjustable by a series of pins $i$, located on the segmental part $i^9$. of the arm $I'$. under which the projecting end of the spring is placed, as is clearly shown in Figs. 1, 4, 8 and 9. These different pins serve to graduate the force necessary to be used to trip the machine. By tripping the machine we mean, starting the binding device and thereby stopping the packers. It will be apparent, hereinafter, that the tripping lever must overcome the tension of this spring, and of course the more spring resistance that is applied by placing the end of the wire under the different pins the more grain will be packed underneath the tripping lever before the tripping lever will yield, and consequently the size of the sheaves will be graduated by this adjustment. Another function of the spring $I^2$. is to throw the end $I^6$ of the lever $I^4$. toward the wheel $J^3$. into position to be struck by the latch $J^5$ after the bundle is discharged and the packers set in motion for its proper action for the succeeding bundle, which is to stop the binding device.

On the opposite end of shaft I. and outside of the frame $P^4$. is rigidly fastened a crank $I^{10}$. which is provided with ways, between which slides the upper end of the tripping lever J. which is fastened to the crank by a bolt and nut in any required position, a slot being provided in the upper end of J. through which the bolt passes. The connection between this and the shaft I, and the tripping lever J. is shown clearly in Fig. 40, the crank shaft being broken off. Only two adjustments are shown in the drawings but it is plain that others may be made in the same way. The upper end of the arm I'. has a projection $I^3$. which extends rearward and parallel or nearly so to the shaft I, and lies over the top of the main frame, which in the vibratory movement of the shaft I. prevents the arm I'. from turning too far in one direction, which direction is toward the gear wheel $J^3$. This is shown clearly in Figs. 1, 8, and 9.

On the outward or forward face of wheel $J^3$. at a suitable distance from its perimeter is fastened a crank pin $J^{14}$. on which works a pitman $J^6$. The lower end of the pitman $J^6$. is connected to a crank $J^{15}$. which is fast on the shaft N' located near the lower limb of the frame $O^2$. and turning in suitable bearings thereon. This connecting rod is made in three parts. The two end pieces on the crank pins, one at each end are made of malleable iron and the center of a wrought iron rod, each end of the rod being furnished with a screw thread which screws into the end pieces, they being provided with a female screw, in order that the connecting rod may be adjusted to the required length; this connection is shown plainly in Figs. 1, 2, 4, and 7.

On the end of shaft N', is rigidly fastened the needle $R^2$. which carries the binding material C. The peculiar contruction of the needle will be more fully hereinafter described. This needle is made to pass up through a slot in the binding table O. Its connection with the shaft N'. and its relation to the binding table is plainly shown in Figs. 5 and 6.

The wheel $J^3$. is provided on its inner or rear face, with a cam groove $J^{19}$. and pivoted to the standard or main frame $O^2$. is a bent arm $J^4$. which carries at its upper end a roller $J^{16}$. turning freely on a pin. This roller travels in the cam groove $J^{19}$. when the wheel $J^3$ is revolved, and this gives an oscillating motion to the bent arm $J^4$. on its pivot $J^{17}$ on the frame in a small arc of a circle.

To the lower end of the bent arm $J^4$. is hinged another connecting rod $J^7$. which extends downward and which is attached to the end of the crank $J^{18}$. on the end of shaft N. The oscillating movement of the bent arm $J^4$. will impart a partial rotary motion to the shaft N. which is supported in suitable bearings on the cross sills O' Near the other end of the shaft N. is firmly attached an arm $O^4$. which extends upward from the shaft and is bifurcated at its upper end and is furnished with holes W. through which bolts are passed to hold a narrow board which extends parallel or nearly so with the delivery edge of the platform O. This board is not shown in the drawings. The purpose of this board is to retain the sheaf in proper position during the binding operation and prevent straws from scattering therefrom, and at the proper time is moved out of the way by the partial rotation of the crank shaft N. to allow the bundle to be discharged.

In front of the piece $O^4$. and to it is fastened rigidly the arm $O^5$. which when the piece $O^4$. is turned upward by the partial rotation of the shaft N. assumes a vertical position or nearly so. The purpose of this arm $O^5$. is to form a resistance to the accumulating grain as it is packed against it by the packer fingers, and unlike the device in my previous patent hereinbefore alluded to, remains stationary during the entire operation of binding the sheaf, and has no forward motion to compress the bundle; it is provided also with a series of holes as shown in Figs. 5 and 6 by which it is adjustably bolted to the arm $O^4$. so that more or less straw may be packed into the sheaf, thereby affording a third means of regulating the size of the sheaf.

The mechanism connecting the wheel $J^3$ with the shaft N. and its attachments are plainly shown in Figs. 2. and 12.

On the shaft P. (outside of the bearing and at the opposite end from the wheel $J^3$.) is rigidly fastened a crank arm $K^2$. On the hub of this crank arm is placed a disk P', between the bearing and the crank arm. This disk P'. is cut away from its circumference toward its center forming an opening $K^5$. leaving sufficient material on its hub for strength, as shown in Figs. 6. and 45.

On the under side of the upper limb of the frame $O^2$. is pivoted about midway of its length a lever K. by a screw bolt passing through the hole $K^3$. (See Fig. 42). The end of this lever toward the grain side of the machine is bifurcated, to take into a clutch box H (see Fig. 38.) in recesses $g^3$. The upper portion of this box is shown in Fig. 43, each portion $k$ of the bifurcated end of lever K. taking into one of the recesses $g^3$. The end of this lever K. toward the stubble side of the machine is provided with a stud-pin $k'$. (see Fig. 42), on which turns a roller $m$ as shown in Fig. 2, and which roller passes around and presses against the side face of the disk P'. The box H. is large enough in circumference to receive a spiral spring $g$. coiled around a shaft $F^3$. one end of this spring being arranged to abut against the nut $g^2$. on the end of shaft $F^3$. and the other end abutting against the hub of the wheel $G^2$. a washer being interposed between the end of the spring and the end of the hub.

The packer driving gear $G^2$. is furnished on its inner face with ratchet teeth $G^4$. which engage with corresponding ratchet teeth $G^3$. on the packer disk G'. the packer disk being fast on the shaft $F^3$. and the gear wheel being loose thereon; when the spiral spring $g$. is allowed to act, it presses the ratchet teeth of the gear wheel $G^2$. into connection with the ratchet teeth $G^3$. and rotates the packer disk G'. and with it the shaft $F^3$. as well as the packer disk G. also fast on the shaft $F^3$. a short distance from the packer disk G'.

Near the peripheries of the packer disks G and G', on pins $f^3$ are mounted the packer fingers $F^2$. We have shown three on each disk.

The packer disks and their connections with the shaft $F^3$, the gear wheel $G^2$, the box H, and the spiral spring $g$, are fully shown in Figs. 38, 39 and 41. The roller $m$ on the end of lever K, which turns upon the pin $k'$ and presses against the disk P', by the force of the coiled spring $g$, drops into the opening $K^5$, see Figs. 6 and 45. The disk P' and its shaft P are stopped by mechanism hereinbefore described acting upon the gear wheel $J^3$, at the right time to allow the roller $m$ to drop into the opening $K^5$, which allows the spring $g$ to push the gear wheel $G^2$ and its clutch connection into mesh with the ratchet teeth $G^3$, thereby starting the packer disks which pack the grain as received from the harvester against the stationary arm $O^5$ and underneath the tripping lever J. until a sufficient amount has been received to force the tripping lever upward, which again starts the gear wheel $J^3$ as already described. The opening $K^5$ in disk P'. where it comes in contact with roller $m$, is beveled off, or made in wedge shape, on its edges (see Fig. 45) and forces out the roller $m$, when the disk is started to revolve, onto the face of the disk, which withdraws the clutch teeth on gear wheel $G^2$, from connection with the clutch teeth $G^3$, on packer disk G'. through the intervention of the lever K, and the packers are stopped. The frame or casting $P^4$ is fastened on the end of the upper limb of the main frame $O^2$, by bolts passing through holes $p$ (see Fig. 44). This frame $P^4$ supports the packer shaft in the box $p'$ and also another shaft in the box $p^2$, which latter shaft supports the discharging arms and cam disks for driving the discharging arms, the knot tyer, and grasper or cord holder.

Fast to the hub of the disk P'. and on the extreme end of shaft P, is the crank arm $K^2$. (See Fig. 45.) This crank-arm is furnished with a pin $K^4$. at its outer end on which is hung one of the discharging arms $P^2$, as shown in Figs. 1, 2 and 6. A short shaft S'. as seen in Fig. 5, passes through the frame $P^4$, in bearing $p^3$, as seen in Fig. 44. This shaft is directly opposite the end of shaft P. and on a line with it, and on its end nearest shaft P. is rigidly fastened a cam disk E. (See Figs. 4, 5 and 33. The hub of this cam disk E. being toward the end of shaft P. is furnished with a crank arm $e^4$, which has at its outer end a hole or opening $e^5$, see Fig. 33. This opening is to receive the pin $K^4$, in crank arm $K^2$, (see Fig. 45) and it is plain that these two crank arms $K^2$, and $e^4$, being placed upon two separate shafts and opposite to each other must move in unison with each other. The crank arm $K^2$, giving motion to the crank arm $e^4$, and the shaft on which it is mounted. The discharging arm before alluded to vibrates on the pin between the crank arms. The hole $e^5$, in crank arm $e^4$, is somewhat elongated to prevent binding in the working of the machine. On the other end of this short shaft S', is fastened another cam disk S, which is provided with another crank arm, fast on the shaft so as to fit in line with the two crank arms $K^2$ and $e^4$, before alluded to, and is provided with a pin $K^6$, which receives the other discharging arm $P^2$. as shown in Figs. 2 and 5. These discharging arms are hung on the pins aforesaid about midway of their lengths and their upper ends hinged to a bifurcated lever $P^3$, as shown in Figs. 1, 2, 4, 5 and 6. The rear end of this bifurcated lever being pivoted to the frame $P^4$, by a bolt at $P^5$, as shown in Figs. 1, 2, 4, 5, 6, and 44. It is plain that the arms $P^2$, will be moved at their points in a path approximating an ellipse, and will strike down behind the bundle and discharge it and then rise and retreat out of the way ready to be actuated again for the succeeding bundle.

It is desirable in grain binders to have a discharging arm on each side of the needle arm, or knotter, inasmuch as, if one discharger only were provided, the heads, or the butts of the grain bound in the bundle, being caught in the grain back of the needle, and about to be bound, the action of such single discharger would be to eject only one end of the bundle from the machine. The knotter and the binder shaft P are both supported from the horizontal upper limb of the binder frame, and it is necessary that sufficient space be provided between the binder frame and the shaft P to permit the revolution of the latter with the crank arms, between which the forward discharging arm is pivoted. At this end, therefore, the frame $P^4$, which is secured rigidly to the upper limb of the binder frame, and extends grainward therefrom to support the packers, also is extended stubbleward and supports at its stubbleward end the arm A in which the knotter is mounted.

The shaft P, gives motion to the short shaft S', through the intervention of the crank arms, and so far as described has relation only to the movement required for the delivery arms $P^2$. The purpose of the cam disks otherwise than giving motion to the delivery arms will be hereinafter more fully described.

Under the bottom edge of the frame $P^4$. as seen in Fig. 44. at $P^6$. the frame $P^4$. is furnished with feet, which receive a casting as shown separately in Fig. 48, which is bolted thereto by bolts passing through holes Q' and $Q^2$ as in Fig. 48; this casting Q. supports the grasper or cord holder and the tucker as will be more fully hereinafter described, together with its connection with the operating mechanism by which they are driven. The casting Q. supports on its uppermost face a stud $Q^3$, see Fig. 48, which receives on to itself the grasper or cord holder lever $B^4$. which is pivoted by means of the opening $Q^6$ in its end so as to oscillate on the stud $Q^3$. and is governed in its movement by the cam disk E. through the intervention of mechanism hereinafter to be described. This movement is imparted to the sliding jaw carrying bar of the grasper or cord holder in a line parallel or nearly so to the shaft P. The grasper lever or cord holder lever B⁴. is pivoted upon the pin Q³ and extends outward toward the delivery side of the machine and is provided with a spring extension b⁵. which takes around the pin b′ on the rod carrying the sliding jaw-carrying bar B′ of the cord-holder which slides freely in the non sliding holder bar B.; the holder arm B. being fastened so as to oscillate on a center at Q⁴. This spring connection is arranged to be graduated by a bolt and nut b³. as seen in Fig. 26. The object of this arrangement of a bolt and nut is to adjust the spring so as to move the sliding jaw carrying bar of the grasper or cord holder a longer or shorter distance so that the jaw b³. may grasp larger or smaller sizes of twine.

On the non-sliding holder arm B. which supports the sliding rod B′. of the holder is fastened a knife B². which presents its edge in a vertical plane toward the jaw upon the end of the bar B′. of the grasper. This knife is held in position between a shield B³. and the holder arm B. by means of two screws. The shank of the knife being provided with slots through which the screws pass which allows the knife to be set in the required position. The purpose of this knife is to cut the cord at the proper time. The end of the shield toward the end of the grasper is curved slightly in order to hold the cord away from the knife until the proper time for cutting the cord, see Fig. 26

The cam disk E. is provided on its periphery with a notch as shown at e³, see Fig. 33, having a lip which extends laterally somewhat beyond the plane of the cam.

Toward the shaft P. screwed into the frame P⁴. or bolted thereto at p⁶. (see Fig. 44) is a stud on which turns freely a pinion D². provided with teeth, alternately long and short both of which series of teeth (long and short) engage the notch e³ see Fig. 33. This pinion has cast upon it a series of inwardly beveled or scalloped flanges or cams of any required number (as shown in the drawings there are four) and also has opposite the retrograding flanges or cams an equal number of beveled projections as shown clearly in Figs. 31, 32 and 34.

On the grasper lever B⁴, (see Fig. 26) is mounted between its oscillating point as shown at Q⁶., Fig. 26 and Q³, Fig. 48, and the pin b′, a roller b⁶, which turns freely on a stud rigidly fastened to the lever B⁴, and this roller is worked between the beveled cams d⁵. and the projections d⁴. on the wheel D², distinctly shown in Figs. 31, 32 and 34. It is plain that the notch e³. on the cam disk E gives motion to the sliding rod carrying the movable jaw of the grasper or cord holder in a right line parallel or nearly so to the shaft P. The side of the cam disk E. opposite the crank arm e⁴, as shown in Fig. 33, presents a cam grooved surface the groove being formed by the projecting flanges e′ and e² and in which a roller e. works which is attached to the upper end of a lever E′, which lever swings on a pivot p⁷. in the frame P⁴. (See Fig. 44.) The lower end of this lever works between the ears b b on the non-sliding arm B of the cord holder and the effect is to swing the entire cord holder on the center Q⁴, see Figs. 26 and 48, backward and forward nearly at right angles to the right line movement of the sliding bar B′ heretofore described; the object of this movement is to give up to the knotter cord enough to tie the knot freely.

Mounted on the holder frame piece Q. (see Fig. 48), is a projection Q⁵. on which is pivoted a tucker c′, see Figs. 28 and 48, at c³. The tucker has two arms, one extending up near the pinion D² and the other down just in front of the knotter. The lower end of the tucker below the pivot is heavier than the upper end and the tendency is to keep the upper end of the tucker in the path of the longest teeth on the hub of the pinion D² and the tension of the cord has the same effect, and when the upper end c². of the tucker comes in contact with one of the long cogs of the pinion D². the upper end is raised and the tucker turning on its pivot raises its lower end, and forces the twine into the grasp of the tyer, as will be more fully hereinafter described. The purpose of the cam disk E, as has been thus fully described is to communicate a sliding motion to the rod carrying the movable jaw of the grasper or cord holder as well as the swinging motion to the entire holder, and also to the tucker, its intermediate means being the pinion D². and the lever E′.

On the frame P⁴, (see Fig. 44,) at p⁹ is bolted an arm or casting A, see Figs. 29 and 49; this arm supports the knot tyer composed of several parts, these parts being shown in detail in Figs. 18, 19, 20, 21, 22, 23, 24, and 29.

In Fig. 20 a is a hollow shaft to which at its lower end is rigidly attached the upper jaw A′ of the knotter hook. On the top of this shaft a is fastened a pinion A¹⁰, through which motion is communicated to the knotting device. Projecting from the frame P⁴ (see Fig. 44) is a stud p⁸ on which oscillates a segmental rack D. the hole D² passing over the stud p⁸. This segmental rack engages with and drives pinion A¹⁰. (See Figs. 20 and 49.) On the hub of the segmental rack D. (see Fig. 27) is hung the plate D′. shown in detail in Fig. 30, the hole D³ passing over the hub.

About midway of the length of D′ is fastened a stud d which receives a roller d′, see Fig. 27. This roller travels in the cam groove on cam disk S. before alluded to which is on the short shaft S′. This connection is shown in dotted lines in Fig. 5. The lower end of the plate D′, (see Fig. 30) is provided with an oblong hole D⁶ through which passes a screw bolt D⁷ which screws into the segmental rack D, thus fastening the plate D'. at its lower end to the segmental rack D; the object of the elongation of this hole is to form a short slot to provide an adjustment of the segmental rack D with said plate. Now when motion is imparted to cam disk S, through mechanism hereinbefore described which mechanism is connected with and actuated by the shaft P, the roller $d'$, will travel in the cam groove of the cam disk S, and oscillate the segmental rack D, which imparts motion to the pinion $A^{10}$, and the shaft $a$ to which is attached the upper jaw A' of the knotter hook. The shaft $a$ is made hollow and through it passes the shaft $a'$, see Fig. 19.

At the bottom of the shaft $a'$ is rigidly attached the lower jaw $A^3$ of the knotter hook which has fastened to it a projecting prong $A^4$, which projects outward at a right angle or nearly so and upward at an angle of about forty five degrees from the plane of the lower jaw of the knotting hook. The lower jaw $A^3$ of this knotter hook is made to act in connection with the upper jaw A', which is fastened to the lower end of the hollow shaft $a$. The purpose of this connection will be more fully hereinafter described.

On top of shaft $a'$ and above the pinion $A^{10}$, is rigidly fastened a cap piece $A^5$, (see Fig. 49) which has a projection extending downward (see Fig. 19) and interposed between this pinion and the lower surface of this cap $a^5$ is a coiled spring $a^{10}$ (see Fig. 49) which is coiled around the hub of $a^5$. The upper end of this coiled spring is hooked to the cap piece $a^5$, and its lower end is hooked around a projection $a^3$ on the pinion $A^{10}$, which projection is an extension of one of the teeth of the pinion $A^{10}$. This tooth $a^3$ is made thicker than the other teeth of the pinion $A^{10}$, in order to give strength to hold the coiled spring $a^{10}$ and to aid the operator in properly setting or timing the segmental gear D, relatively to, and in connection with the pinion $A^{10}$. The object of this coiled spring is to hold the knotter jaws A' and $A^3$ in connection with each other so that at the proper time the binding cord may pass by them both.

On the frame A, which supports the knotter is cast a prong $A^9$, which extends upward in a curved form far enough inward toward the knotter shaft to pass the projection $a^5$, (see Fig. 49.) When the pinion $A^{10}$ is partially revolved and gives motion to the hollow shaft $a$, and by it to the upper jaw A' of the knotter hook, the coiled spring $a^{10}$ holds the two knotter jaws in close connection, see Fig. 49. When the pinion $A^{10}$, is revolved a sufficient distance so that the projection $a^5$ strikes against the end of the horn $A^9$., the shaft $a'$ will stop, the spiral spring $a^{10}$ being overcome, while the hollow shaft $a$, will continue to revolve a short distance, thus opening the knotter jaws A' and $A^3$ sufficiently to allow the two strands of the binding cord to enter between them; their entrance therein being made certain by the action of the tucker $c'$.

Underneath the pinion $A^{10}$. is cast to it a flange semicircular in form as seen at $a^2$, see Figs. 20 and 49. This semicircular flange $a^2$. extends about half way around the circumference of the pinion $A^{10}$. Passing through the hole $a^{17}$, in the arm A (see Fig. 29) is the shaft $a^4$. (see Fig. 24) which oscillates freely therein; on the upper end of this shaft is fastened a crooked lever $A^8$. One end of this lever extends from the shaft $a^4$. toward the pinion $A^{10}$, and is so arranged as to be held against the edge or face of the semicircular piece cast on the pinion $A^{10}$. by means of a spiral spring $a^8$, interposed between its other end at $a^6$ and a projection $a^7$ on the rigid arm A, see Figs. 24, 29 and 49.

On the lower end of the shaft $a^4$. is rigidly fastened the stripper arm $A^7$ one end of which is made in hook form at $A^6$. and extends to and strikes against the surface of the upper jaw A' of the knotter hook, see Figs. 20, 22, 23 and 49. As the knotter hook recedes, the stripper hook is forced outward by the cam shaped surface of the upper jaw of the knotter hook, and the point of the stripper hook presses hard against the outer surface of the upper jaw A' of the knotter hook, the purpose being to draw the knot off from the jaws of the knotter hook. At the moment the knotter hook passes the stripper hook, the circular flange $a^2$, of the pinion $A^{10}$, in its partial revolution strikes against the curved portion $a^{18}$, of the lever $A^8$, and thereby holds the stripper hook in that position until the knotter has completed its receding motion, and also its forward motion for the next knot, when the lever leaves the semicircular flange and the stripper hook presses against the knotter hook until the forward motion is completed and also the receding movement of the knotter until the knot is released as before.

The packer fingers F' (see Figs. 37 and 38) are hinged on the inner sides of the packer disks G, and G', near their peripheries, on pins fastened into the disks at $f^3$ (see Fig. 38) and can turn freely on these pins until they strike on the hubs of the wheels, as shown in Fig. 38, where one of the packer fingers is shown in this position.

The packer disks G and G', are made with a rim extending inwardly. In other words the faces or edges of the packer disks are made wider by this rim and a small projection $f^2$, on the packer fingers F', (see Fig. 37) strikes against this projecting rim on its inner surface, to prevent the packer fingers swinging outward too far, when the packer disks revolve. A casting F, (see Fig. 35) is bolted to the frame $P^4$, underneath the box $p'$, see Fig. 44. This casting F, is furnished with semicircular cam flanges $f$, on each end; on the peripheries of these flanges as the packer disks are revolved, the rear surfaces of the packer fingers rest, and by being moved over these cam flanges $f$, they are thrown out and held in this position while packing the grain into a sheaf; as soon as these fingers have passed the cam flanges $f$, they will be opposed by the grain which they have already packed and will be moved on their pins toward the center of the packer disks, and out of the way of the grain. These cam flanges $f$, are so arranged with reference to the position of the needle, that the fingers will move the grain entirely away from the point of the needle, so that the needle will have free passage between the grain as packed in the receptacle ready to be bound and the inflowing grain.

The needle $R^2$. shown plainly in Figs. 5 and 6 is fast to and actuated by the shaft $N'$, is curvilinear in form and so arranged as to carry the binding material to and above the knot tying device, and is made in two parts the part $R'$, being riveted to $R^2$. at $R$. and also at $R^8$ see Figs. 5 and 6. This piece $R'$, forms a guard and makes the rear of the needle much wider or fan shaped, the object being as the needle passes up through the platform, to make a broad separation, between the grain which is to be bound into a sheaf and the grain which is accumulating upon the platform for the succeeding sheaf. The guard piece $R'$. is so long that its rear end never passes above the platform and thus in its reverse or backward movement the separation is maintained and no straws can be carried down through the slot in the platform by the needle. Figs. 46 and 47 represent a needle of different construction. The forward portion of the piece $R^5$, which answers to guard piece $R'$. in Fig. 5, is hinged to the needle $R^2$, at $R^3$, and its rear end is hinged to a link $R^6$. at $R^4$. The link $R^6$, turns on a stud pin $R^7$. fast to the frame of the machine. The object of thus hinging this portion of the needle is to save room, as in machines where the binding table is located near the ground or near the harvester frame or any other obstruction, there might not be room for the other form of needle.

The hinged portion of the needle as shown in Figs. 46 and 47. accomplishes the same result as to the separation of the grain as is accomplished by the construction shown in Figs. 5. and 6. The advantage in this new form of construction is that it may be used on machines in which the binder table is near the ground and where the other form would be impossible.

On each side of the slot in the binder platform through which the needle passes, is placed a cleat or strip of wood $O^3$ which runs parallel with the slot and their ends are hinged to the binder platform, on the end of the same next to the harvester. The other ends of these pieces are attached to a curved rod $O^7$ running through the hooked end of a clamping bolt $O^8$ passing through one of the sills $O'$, of the binder. This connection admits of adjustment of the pieces simultaneously up and down, to graduate the size of the bundle to be bound, as it is evident that if these pieces are raised there will be less space for the sheaf as it is packed under the tripping lever J. and vice-versa and thus the machine will bind smaller or larger bundles. This adjustment is plainly shown in Figs. 3, 5 and 6.

The operation of the machine is as follows, the binder being placed at the delivery end of the harvester in such a way that the straws of cut grain will be delivered to it: The ball of cord or twine for binding is placed in a can at some convenient place on the machine. The cord is passed from the ball between the jaws of the tension device $O^6$, (this device is made so as to be regulated by a hand screw and is for the purpose of keeping the twine taut, as is plainly shown in Figs. 3 and 5;) it is then placed in the groove on the back of the needle and passed through the hole near the point of the needle, and thence to the grasper or cord holder, where the end is held by the jaws $b^2$ and $b^3$ of the grasper. The needle $R^2$. being under the platform O. and the end of the cord or twine being fast in the grasper; the machine being started the grain falls from the harvester and within reach of the packer fingers $F'$. the main shaft $M'$ being in motion communicates motion to the packers, which take hold of the grain and pack the same against the twine and press the twine before it, the twine drawing through the eye of the needle and from the ball until the grain reaches the stationary part $O^5$, which offers a permanent resistance to the forming bundle, and the grain is also packed under and against the tripping lever J, until sufficient quantity is thus packed to raise the tripping lever J; when the tripping lever J, is thus raised by the accumulated straw, it turns the shaft I. and the crooked shifter lever $I^4$. is withdrawn from the latch $J^5$, and the gear wheel $J^3$ is set in motion, the roller $m$ on lever K. being in the opening $K^5$. on disk $P'$, allowing the packer disks to be in gear, is by the rotation of shaft P and disk $P'$, forced out on the face of the disk $P'$ and the packers are stopped. The needle comes up through the platform and carrying with it the twine encircles the bundle, compressing and shaping the sheaf against the stationary post $O^5$. The point of the needle passes over and beyond the tyer leaving the two strands of the twine across the tyer, the points of the two jaws being close together and pointing toward the grain side of the machine. The tyer is made to turn, by mechanism described, both knotter jaws together, about four fifths of a revolution. The points of the knotter jaws passing over both branches of the twine and the prong $A^4$, strike against the twine and force both strands down below the knotter jaws thus crossing the twine. The sliding bar $B'$ of the grasper and its support B, swing up toward the knotter, by mechanism before described, far enough to give slack twine enough to tie the knot. When the cap $a^5$ strikes against the projection $A^9$. on the rigid arm A, the shaft $a'$ and the lower knotter jaw on its end, is stopped and the shaft $a$, continues to move until the two jaws are of sufficient distance apart at their points to admit both strands of the twine between them and the tucker acting at this time forces the twine into the opening between the knotter jaws, as shown in Fig. 17, when the upper knotter jaw is made to recede by the reverse action of the segmental rack on pinion $A^{10}$ and the upper knotter jaw $A'$ approaches and carries its hook $A^2$ in contact with the end of the lower knotter jaws $A^3$ at $A^5$, and includes the twine in the space between them. This space is shown in Fig. 49. At this time the movable jaw carrying rod $B'$ of the grasper or cord holder opens and lets go the strand of string held by it and closing again takes hold of the other strand and at the same time cuts off the held strand by the action of the knife $B^2$. At this time the knot is completed by the knotter in its receding motion, carrying the knot against the stripping hook, by which the knot is drawn off the jaws over the loop held between the barb $a^2$ and the part $a^5$ of the jaw $a^3$. The stationary post $O^5$, and the board connected with it are swung down and out of the way and the discharging arms swing outward and discharge the bound bundle from the machine. The needle recedes again beneath the platform, the binding mechanism comes to rest in proper position and the packers again start for the succeeding bundle.

Having thus fully described our invention, what we claim as new, and desire to secure by Letters Patent, is—

1. The combination with the intermittently operated shaft P, provided on its inner end with a crank arm, of the short supplemental shaft adapted to operate the knotting devices and provided with an opposing crank arm, connected to the crank on shaft P and the discharging arm pivoted between the opposing crank arms, whereby motion is communicated to the knotting devices and the discharging arm is also operated by the same shaft, substantially as and for the purpose specified.

2. The combination with the tripping lever of an automatic grain binder, of the two interlocking members of a toothed clutch, adapted to intermittently operate the binding mechanism, said members being forced into engagement by a spring, interposed between the sliding member of the clutch and some fixed portion of the machine, positively acting clutch shipping mechanism, and a stronger spring interposed between the clutch shipping mechanism and the binder driving wheel by which the said stronger spring is positively compressed during the binding operation against some fixed portion of the machine, and then suddenly released to overcome the action of the weaker spring acting to keep the clutch in engagement, whereby the separation of the clutches is continued substantially as and for the purpose set forth.

3. The combination in an automatic grain binder, of two interlocking clutch members, the binder driving gear wheel, a spring latch pivoted to the side thereof, a stationary projection on the machine in the path of the pivoted spring latch, and a clutch shipping lever yoked to one member of the clutch, and in the path of the spring latch, substantially as and for the purpose specified.

4. The combination with a knotter, and mechanism to impart a reciprocating movement thereto, of a pivoted stripper, a spring to force the stripper in contact with the knotter during the reverse rotation of the latter, and a cam on the knotter spindle to hold the stripper away from the knotter during the initial forward movement thereof, substantially as and for the purpose specified.

5. The combination, in a knotter, of an upper knotter hook, its hollow spindle, the lower hook and its spindle fitting within the hollow spindle, a spring to cause the hooks to rotate together, a projection on the spindle of the lower hook, and a projection on the knotter frame to stop the revolution of the lower hook, whereby the hooks are separated to permit the entrance of the bands between them, substantially as and for the purpose specified.

6. The combination in an automatic grain binder, of the breast plate, a grasper frame pivoted thereto, a cam wheel on the knotter driving shaft, a pivoted lever connected at one end to the pivoted grasper frame, and at the other taking into a cam groove in the wheel, a grasper sliding within the grasper frame, a pinion mounted on a horizontal shaft and receiving motion from the knotter driving shaft, and cam grooves in the pinion to open and close the grasper, substantially as and for the purpose specified.

7. The combination in an automatic grain binder, of a rock shaft pivoted at the outer edge of the binder receptacle, and a casting mounted thereon, a board which sustains the sheaf secured to the casting, and a compressor post adjustably secured to the latter, an arm pivoted on the frame, a cam wheel on the binder driving shaft by which the pivoted arm is actuated, and a pitman connecting the pivoted arm and the rock shaft, substantially as and for the purpose specified.

8. In an automatic grain binder the swinging arm $O^4$, which supports a board to hold the sheaf, and the post $O^5$ against which the grain is compressed, the two arms $O^4$ and $O^5$ being adjustably fastened together in combination with the crank shaft N, the main wheel $J^3$ its cam, the pivoted bent arm $J^4$ and connecting rod $J^7$, for swinging the same out of the way to allow the bundle to be discharged and back again to receive the next bundle, substantially as described.

9. The combination with the breast plate of an automatic grain binder of a binding platform composed of two fixed sections and an intermediate section immediately beneath the breast plate and adjustable with relation thereto, whereby the passage-way for the grain may be enlarged or reduced substantially as and for the purpose set forth.

10. The combination in a grain binder, of a main driving shaft, an interlocking clutch composed of two members, one fast to the shaft, and the other sliding thereon, the main binder gear, a pinion meshing therewith and carried on the sliding member of the clutch, a spring to force the two members of the clutch into engagement, a lever yoked to the sliding member of the clutch, a spring latch on the binder gear to cause the partial disengagement of the clutches, and a projection on the frame, against which the spring latch is compressed, and subsequently released therefrom to complete the separation of the members of the clutch, substantially as and for the purpose specified.

11. The combination with a tripping lever shaft of the tripping lever adjustably secured thereto, the driving shaft, an interlocking clutch mounted thereon, and the shifter lever mounted on the driving shaft and having its end pivotally connected with a crank on the tripping shaft and yoked to the movable member of the clutch and means for holding the lever with the movable member of the clutch from the fixed member until the trip shaft is rocked substantially as and for the purpose set forth.

12. The combination of the hinged adjustable cleat $O^3$, the tripping lever placed above it and means substantially as described for adjusting the cleat vertically in relation to said tripping lever whereby the passage way for the grain may be enlarged or decreased, substantially as and for the purpose specified.

13. In a grain binding machine, the combination of the breast plate, a binder table placed below it, and means substantially as described for adjusting said table vertically in relation to said breast plate, whereby the passage way for the grain may be enlarged or reduced substantially as and for the purpose specified.

14. The combination in a grain binding harvester, of a binder shaft and its wheel, an automatic clutch serving to intermittently actuate the binder, a spring to cause the engagement of one member of the clutch with the other, a second spring located on a movable support to cause the disengagement of the two members of the clutch, and a fixed projection on the machine to compress the separating spring during the revolution of the binder shaft, whereby when the spring is released, the separation of the clutch is completed, as specified.

15. The combination in a grain binder, of a clutch composed of the members, a shifter to disengage one member of the clutch from the other, a spring to cause the engagement of the clutch members, a stronger spring compressed by the revolution of the binder driving shaft or wheel, and then suddenly released to act upon the shifter to complete the separation of the clutch members substantially as specified.

16. The combination with the knotter actuating shaft provided with crank arms, of the needle arm shaft parallel with the knotter actuating shaft, the discharging arms pivoted on the crank arms and having a link connection at their upper ends, with some fixed portion of the machine, a pitman connection between the needle arm shaft and the knotter actuating shaft, whereby the discharging arms act in unison with the needle, and are brought back of the bundle to discharge it from the machine.

17. The combination with the binder-shaft, a double crank arm thereon, the discharging arm pivoted at about the middle of its length on the crank arm, and connected to a link, the binder frame adapted to support the binder shaft, and the knotter frame extending stubbleward from the binder frame, and supported therefrom, whereby sufficient space is provided between the binder frame and the binder shaft to permit the revolution of the discharger, substantially as and for the purpose specified.

HECTOR A. HOLMES.
     WATSON M. HOLMES.

Witnesses:
 J. RUSSELL PARSONS,
 W. B. MASSON.